US 7,003,611 B2

(12) United States Patent
Arndt (10) Patent No.: US 7,003,611 B2
(45) Date of Patent: Feb. 21, 2006

(54) METHOD AND APPARATUS FOR HANDLING INTERRUPTS USING A SET OF INTERRUPTS SERVERS ASSOCIATED WITH PRESENTATION CONTROLLERS

(75) Inventor: Richard Louis Arndt, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 164 days.

(21) Appl. No.: 10/675,676

(22) Filed: Sep. 30, 2003

(65) Prior Publication Data

US 2005/0080969 A1  Apr. 14, 2005

(51) Int. Cl.
*G06F 13/24* (2006.01)
(52) U.S. Cl. .................................. 710/260; 710/268
(58) Field of Classification Search ............. 710/48, 710/244, 260–266, 269, 268; 712/40
See application file for complete search history.

(56) References Cited

U.S. PATENT DOCUMENTS

| 5,701,495 A | | 12/1997 | Arndt et al. ............... 395/736 |
|---|---|---|---|
| 5,701,496 A | * | 12/1997 | Nizar et al. ................ 710/266 |
| 5,802,377 A | * | 9/1998 | Deshpande ................ 710/260 |
| 5,892,957 A | * | 4/1999 | Normoyle et al. .......... 710/263 |
| 5,983,308 A | * | 11/1999 | Kerstein ...................... 710/263 |
| 6,021,456 A | * | 2/2000 | Herdeg et al. .............. 710/260 |
| 6,233,643 B1 | * | 5/2001 | Andrews et al. ............ 710/316 |
| 6,430,643 B1 | | 8/2002 | Arndt .......................... 710/263 |

OTHER PUBLICATIONS

"Peripheral interface standards for microprocessors" by Nicoud, J. D. (abstract only) Publication Date: Jun. 1976.*

* cited by examiner

*Primary Examiner*—Gopal C. Ray
(74) *Attorney, Agent, or Firm*—Duke W. Yee; Mark E. McBurney; Brian D. Owens (57) ABSTRACT

A method, apparatus, and computer instructions for managing interrupts using a set of presentation controllers. A first interrupt server is identified in the set of interrupt servers to handle the interrupt in response to receiving an interrupt signal. The set of interrupt servers constituting a server pool are linked in a circular list using a set of identifiers. The message representing the interrupt is sent to a second interrupt server, such as in a second presentation controller in the set of presentation controllers based on an identifier identifying the second interrupt server in the set of interrupt servers, if the first interrupt server is unable to handle the interrupt. The identifier is found within the first interrupt controller. The interrupt is passed to different interrupt servers potentially associated with different presentation controllers within the circular list.

25 Claims, 4 Drawing Sheets

METHOD AND APPARATUS FOR HANDLING INTERRUPTS USING A SET OF INTERRUPTS SERVERS ASSOCIATED WITH PRESENTATION CONTROLLERS

BACKGROUND OF THE INVENTION

1. Technical Field

The present invention relates generally to an improved data processing system and in particular to a method and apparatus for processing interrupts. Still more particularly, the present invention relates to a method, apparatus, and computer instructions for managing interrupts using multiple processors.

2. Description of Related Art

Interrupt handling mechanisms have been developed for more effectively dealing with input/output transactions between a processor and a peripheral device connected to the processor. Whenever a peripheral device requires processor support as part of an input/output (I/O) operation, the device sends an interrupt signal to the processor to notify that an interrupt condition exists in the peripheral device. Depending on the type of interrupt signal received, the processor may elect to ignore the interrupt and finish the current process or handle the interrupt when the signal is received. Once the interrupt signal is handled by the interrupt handling mechanism, the processor returns to the previous state that was present before the interrupt occurred. An interrupt source may be, for example, a keyboard, an adapter, or any other device connected to the processor.

The processing of an interrupt request typically involves the processor interrogating the source of the interrupt, performing specific functions based on the type of interrupt, and finally, resetting or turning off the interrupt request. Several different types of interrupt requests exist. For example, when an interrupt request is deferred by the processor, the interrupt request is referred to as a masked request. Another type of interrupt request may also be prioritized by a particular system, if the request from one device is more urgent than a request from another device. Thus, the request from one device is considered to have priority over the request from the other device. The priority of an interrupt request is predefined in the data processing system. When an interrupt request has been accepted by a processor, a subsequent interrupt request cannot interrupt the current interrupt request unless the subsequent interrupt request has priority over the current interrupt request. If the subsequent interrupt request does not have priority, then the subsequent interrupt request waits until the current request is handled.

As data processing systems become more complex, containing more peripheral devices, the increasing number of interrupt requests generated by these devices slow down the processor. As a result, interrupt controllers have been developed to delegate certain interrupt functions from the processor to the interrupt controller. These interrupt controllers allow the processor to continue working without having to service an interrupt request at the time the request is first made. The interrupt controller is used to monitor interrupt sources, while only interrupting the processor using a single interrupt line.

These types of interrupt controllers were initially developed for use within a single processor data processing system. This type of interrupt subsystem typically had few interrupt sources or priority levels. With the introduction of multi-processor data processing systems, more than one processor within this type of system is capable of handling an interrupt request. However, an interrupt signal for each interrupt source has to be wired to each processor or interrupt controller capable of servicing an interrupt to allow those processors to handle these interrupt requests. Such an architecture leads to increases in bus complexity, because of the number of interrupt signals that have to be hardwired to each processor in the system.

In response, dedicated interrupt controllers have been provided for each processor in a data processing system. This kind of approach, however, is costly and does not allow for effective management of interrupts as the number of interrupt sources and priority levels increase.

Another type of interrupt subsystem provides for queuing of interrupts from many sources and presenting interrupts to the processor bus in the multiprocessor system. The selection of the processor to interrupt is accomplished by separating the internal interrupt mechanism into two layers, an interrupt routing layer and an interrupt presentation layer. The interrupt routing layer routes the interrupt conditions to the appropriate instance of an interrupt management area within the interrupt presentation layer. The interrupt presentation layer communicates the interrupt source to the system software which is to service or process the interrupt. By providing two layers within the interrupt subsystem, application or system software may be written, which is independent from the specifics of the processor selection mechanism used by the interrupt routing layer. The interrupt routing layer hides the details of a particular hardware implementation from the software. The interrupt presentation layer interfaces to the system and/or application software and provides hardware independent functionality. Interrupt lines from the various interrupt sources are input into an interrupt source controller. This interrupt source controller is connected using a fabric, such as a bus, which also is connected to the interrupt presentation controllers.

Interrupt presentation controllers are used to present interrupts to the processors in the data processing system. Each processor in the data processing system is associated with a memory mapped interrupt management area. Some implementations distribute the interrupt presentation layer by placing the interrupt management areas for some of the platform processors in one chip and the interrupt management areas of the rest of the processors in other chips.

Placement of the interrupt management area on different chips occurs because of the impracticality of integrating the interrupt presentation controller for all system processors within a single chip. However, when the interrupt management areas are implemented on different chips, interrupt messages may have to be forwarded between implementing chips if no accepting processor can be found in the original presentation layer chip.

Furthermore, if a priority-based assignment is implemented in an interrupt subsystem, then the priority of the least favorite processor may be broadcast to the other presentation layer chips. These methods for allowing the proper assignment of interrupt requests to multiple interrupt presentation controllers are currently complex and/or require significant amounts of specialized signal wires between the multiple controllers.

The interrupt subsystem is often required to aggregate the sub-set of processors from the total number of processors in a data processing system into a group server pool. Within this group server pool is a group of processors in which any available processor is able to handle a given interrupt request. The interrupt subsystem is required to deliver interrupts to one of the available processors within the group.

Shortcomings in these types of interrupt subsystems involve the use of a central collection of logic that stores the identification of processors selected for handling interrupts. The problem with this type of interrupt subsystem is that the central collection of logic has to increase in size and complexity as the total number of processors that are supported grows. As a result, the central collection of logic becomes large and expensive having to be sized for the maximum number of processors that the system can support, even though most systems are not that large. Further, this central collection of logic also becomes a single point of failure for the entire interrupt subsystem. As a result, duplication or redundancy is required to guard against such failures.

In another type of interrupt subsystem architecture, interrupts are directed to all processors in the system until a processor is selected. Such a system encounters a problem because interrupt messages must be directed to interrupt controllers that have no potential for being candidates for taking interrupt requests. As a result, an excess load is generated on those interrupt controllers. Further, for each interrupt condition, interrupt messages on average circulate about 1.5 times around all the interrupt controllers and in many cases, more often. As a result, excess message traffic is placed on the busses within the data processing system. Additionally, certain processors may tend to receive more interrupt requests than other processors. These processors are typically ones handling background work. As a result, the background work is penalized by sending interrupts to those processors.

Therefore, it would be advantageous to have an improved method, apparatus, and computer instructions for handling interrupts in the data processing system.

SUMMARY OF THE INVENTION

The present invention provides a method, apparatus, and computer instructions for managing interrupts using a set of presentation controllers. Each interrupt presentation controller contains a set of interrupt management areas (one for each processor associated with the interrupt presentation controller—the combination of interrupt management area and processor is known as an "interrupt server"). A first interrupt server is identified in the set of interrupt servers to handle the interrupt in response to receiving an interrupt signal. The set of interrupt servers constituting a server pool are linked in a circular list using a set of identifiers found in the interrupt management area of the interrupt servers within the set of presentation controllers. The message representing the interrupt is sent to a second interrupt server, such as in a second presentation controller in the set of presentation controllers based on an identifier identifying the second interrupt server in the set of interrupt servers, if the first interrupt server is unable to handle the interrupt. The identifier is found within the interrupt management area of the first interrupt server. The interrupt is passed within the circular list until one of the interrupt servers is able to process the interrupt or until all servers in the list have passed the interrupt message—at which time the interrupt message is rejected back to the interrupt source controller for later representation.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
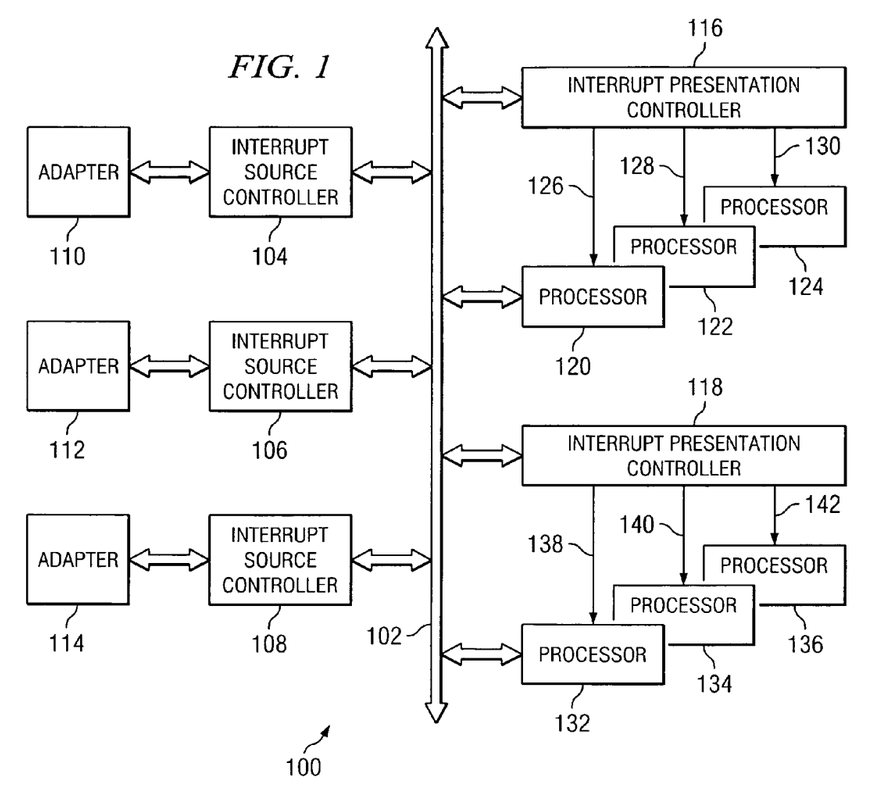
FIG. 1 is a diagram of a data processing system in which the present invention may be implemented.

With reference now to the figures and in particular with reference to FIG. 1, a diagram of a data processing system is depicted in which the present invention may be implemented. Data processing system 100 includes interconnect fabric 102, which allows for the transfer of data among different components in data processing system 100. Interconnect fabric 102 takes the form of a bus in the depicted examples. Of course, depending on the implementation, interconnect fabric 102 may take other forms, such as a switch.

In these examples, interrupt source controllers 104, 106, and 108 are connected to interconnect fabric 102. These components receive interrupt signals from components, such as adapters 110, 112, and 114. These components generate interrupt messages or interrupt signals through wires that connect the components to interrupt source controllers 104, 106, and 108. Of course, other types of devices or components other than adapters also may be connected to these controllers to generate interrupt signals.

Data processing system 100 also includes interrupt presentation controller 116 and interrupt presentation controller 118, which are connected to interconnect fabric 102. Processors 120, 122, and 124 are connected to interrupt presentation controller 116 through interrupt lines 126, 128, and 130. Processors 132, 134, and 136 are connected to interrupt presentation controller 118 by interrupt lines 138, 140, and 142.

Each of these processors in data processing system 100 is associated with a memory mapped interrupt management area, contained within their respective interrupt presentation controllers, the interrupt management area contains an external interrupt register (XIRR). In these examples, the XIRR is a four-byte register. This register in these examples includes two fields: a current processor priority register (CPPR) and an external interrupt source register (XISR).

The CPPR contains the processor's operating priority. This register may be written by software to prevent interruptions from less favored priority requests. An interrupt should be routed to a processor only if the processor's CPPR field is less favored than the priority of the interrupt request. The software stores an interrupt level value to the CPPR in these examples as a one-byte register to inform the interrupt hardware of the current operation priority of the processor. The CPPR reflects the operating priority of the processor, the operating priority of the processor becomes the priority of the interrupt, if any, associated with the value of the XISR.

To determine the source of an interrupt, software reads the XISR by issuing a load instruction to the XIRR. The value of the XISR specifies the source of the interrupt. For interrupts from an interrupt source controller, such as interrupt source controllers 104, 106, or 108, the upper bits of the XISR identify the interrupt source controller, which presents the interrupt message. The lower four bits of the XISR field define the particular source of the interrupt message.

The present invention uses the interrupt subsystem architecture in data processing system 100 in FIG. 1 to more efficiently assign interrupts to different processors with respect to prior art systems. When interrupt signals are received from a component, such as adapter 110, by an interrupt source controller, such as interrupt source controller 104, the interrupt is received over a line, which is associated with a particular interrupt server number.

In these examples, the interrupt server number field of the interrupt message is addressed to an interrupt server within a group of pooled processors, rather than the name of the group server pool. Further, the interrupt servers associated with the interrupt presentation controllers are linked together in a circular list. For example, interrupt management areas housed in interrupt presentation controller 116 and interrupt presentation controller 118 include a link register in which the link register in interrupt presentation controller 116 points to interrupt presentation controller 118. In these examples, the register contains a pointer or address to an interrupt management area in another interrupt presentation controller.

In these illustrative examples, a first fit algorithm is implemented to determine whether a particular processor is able to handle an interrupt request. A comparison of the priority of the interrupt message or request is made to the priority of the interrupt server. If the priority of the interrupt server is less favored than that of the interrupt message, the presentation controller will accept the interrupt for that interrupt server. Of course, any desired process may be used to determine if an interrupt will be handled.

In these examples, if the priority of the interrupt message is less than or equal to the priority of the interrupt server, that interrupt server is unable to handle the interrupt request. As a result, the interrupt presentation controller routes that interrupt request to the interrupt server identified in the link register this interrupt server may be associated with the same or a different interrupt presentation controller. High order bits in the interrupt server address contained in the link register specify the associated interrupt presentation controller, while low order bits specify the particular interrupt server within that interrupt presentation controller.

In this manner, less traffic is present across interconnect fabric 102 because less messages have to be sent back and forth among the interrupt source controllers and interrupt presentation controllers than would be required if the interrupt server number in the original interrupt message represented the name of an interrupt server pool rather than the address of one of the pool's members.

Figure 2:
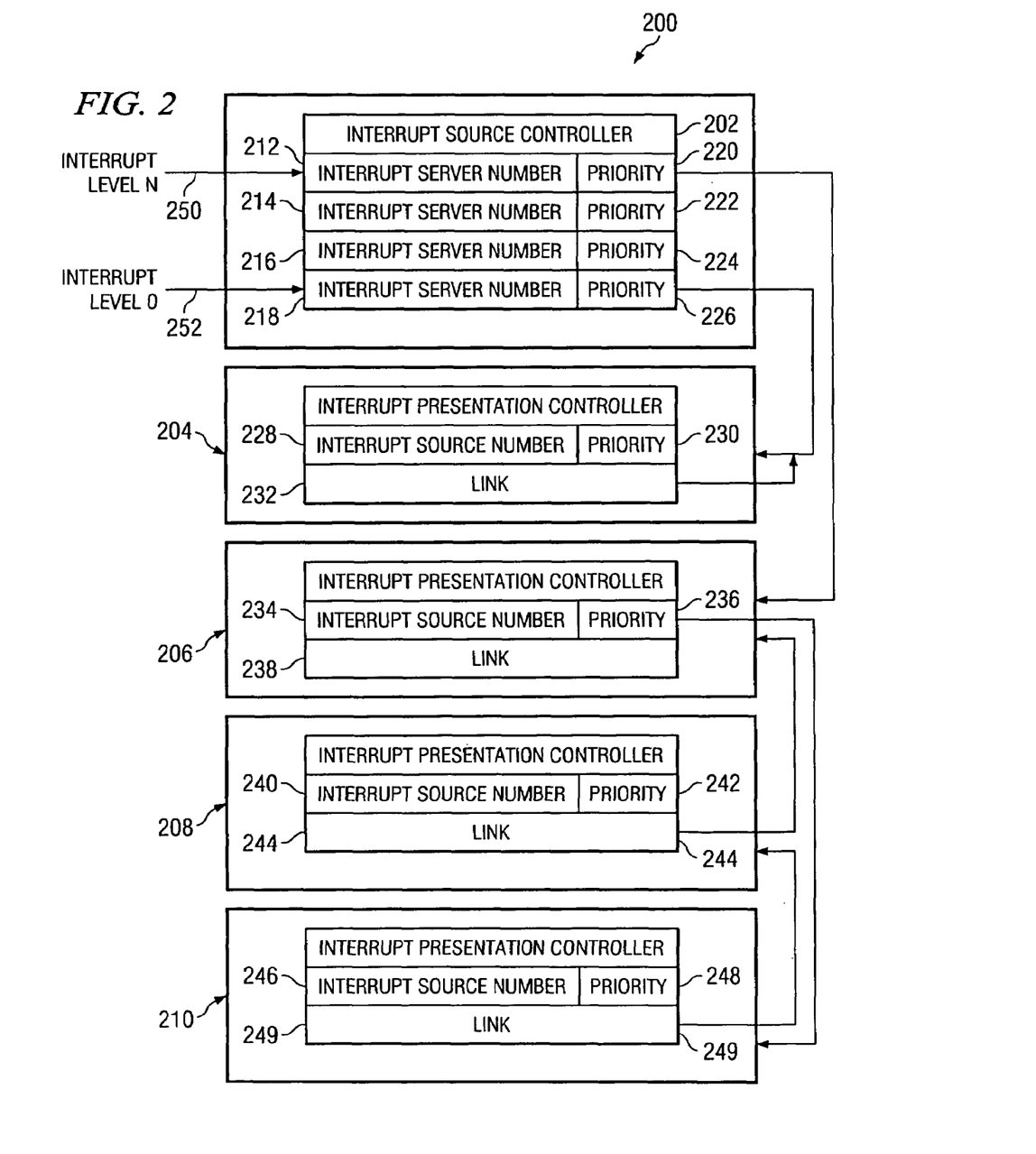
FIG. 2 is a diagram illustrating components used in handling interrupt requests in accordance with a preferred embodiment of the present invention.

Turning next to FIG. 2, a diagram illustrating components used in handling interrupt requests is depicted in accordance with a preferred embodiment of the present invention. In the depicted examples, interrupt subsystem 200 receives interrupt signals from devices, such as adapters, at interrupt source controller 202. Interrupt source controller 202 is an example of an interrupt source controller, such as interrupt source controller 104 in FIG. 1. Interrupt subsystem 200 also includes interrupt presentation controllers 204, 206, 208, and 210. These interrupt presentation controllers are examples of an interrupt presentation controller, such as interrupt presentation controller 116 in FIG. 1. However, for simplicity, in FIG. 2 these interrupt presentation controllers 204,206,208, and 210 are depicted containing only a single interrupt management area for one processor rather than the three that would be required for interrupt presentation controllers 116 and 118 in FIG. 1.

Interrupt source controller 202 contains interrupt server number fields 212, 214, 216, and 218. These interrupt server number fields are associated with priorities 220, 222, 224, and 226. The interrupt server numbers in these fields are used to identify the interrupt server within the interrupt presentation controller that is to service the particular interrupt request.

For example, the low order bits of an interrupt server number may be the address of one of the interrupt servers within one of the interrupt presentation controllers addressed by higher order bits, while the highest order bit(s) indicates that the interrupt is to be serviced by a specific pool of interrupt servers. Alternatively, the high order bit also may indicate that the interrupt request must be serviced by a specific interrupt server associated with a specific interrupt presentation controller.

Interrupt presentation controller 204 contains the interrupt management area for an interrupt server—represented is the subset of this area relevant to this invention, including interrupt source number 228, priority 230, (collectively known as the XIRR as described above) and link register 232; similarly, interrupt presentation controller 206 includes interrupt source number 234, priority 236, and link register 238; interrupt presentation controller 208 includes interrupt source number 240, priority 242, and link register 244; and interrupt presentation controller 210 contains interrupt source number 246, priority 248, and link register 249.

Interrupt source number registers 228, 234, 240, and 246 are set by the hardware to indicate which interrupt source caused the interrupt, thus, allowing the servicing processor to read which of potentially millions of interrupt sources caused the interrupt and thus determine which interrupt service routine to invoke. At system initialization time, the device control programs are loaded and configured and they "register" their associated interrupt service routines with the operating system to get control, when a specific interrupt source signals an interrupt.

The priority fields 230, 236, 242, and 248 in interrupt presentation controllers 204, 206, 208, and 210 of interrupt subsystem 200 are used to indicate the current operating priority of the various interrupt servers. The priority assigned to a given interrupt source 220, 222, 224, and 226 is dependent upon the I/O adapter using that interrupt source. In many cases, the interrupt source is directly wired to a given I/O adapter card slot. Thus, as different cards may be plugged into that slot from time to time, the priority must be changed to meet the needs of the currently plugged adapter. Currently, in platforms, such as PCI based platforms, initialization code reads the I/O adapter identifier for each I/O adapter card slot from an architected register in the I/O adapter. Next, this code loads in the device control program, also known as a device driver associated with that I/O adapter identifier and passes to the device driver the interrupt source number associated with its I/O adapter. The device driver then sets the priority of the interrupt source associated with its I/O adapter as required by the adapter's characteristics.

The priority in the CPPR is set by two conditions. First, when an interrupt is assigned to an interrupt server by the interrupt presentation controller, the CPPR is set to the priority of that interrupt. This results in the operating priority of the assigned interrupt server being raised to that of the assigned interrupt source. The other way that the CPPR is set is by the server's software. In response to the need for device drivers to postpone interrupts for a period of time, the server software may raise the priority of the server by placing a more favored level in the CPPR. When the interrupt service code completes servicing an interrupt event, the software performs an "end of interrupt" operation that loads the CPPR with a less favored level so that the server can return to the level of a pre-empted interrupt or background task. The link registers in each of the presentation controllers each point to another interrupt server, in the same or another presentation controller in interrupt subsystem 200.

In accordance with a preferred embodiment of the present invention, one or more groups of interrupt servers may be linked in a circular or looped fashion for handling interrupt requests. If an interrupt server is unable to handle a request, that interrupt request is then sent to another interrupt server in the group using the address identified in the link register.

In these examples, interrupt signals are sent to interrupt source controller 202 through signal lines 250 and 252. The interrupt generated on signal line 252 results in an interrupt message being sent to the interrupt management area in interrupt presentation controller 204. The interrupt message is sent to this interrupt presentation controller because the interrupt server number points to this particular interrupt server. The address in link register 232 points back to the interrupt management area in interrupt presentation controller 204. In this illustrative example, only the interrupt server associated with interrupt presentation controller 204 is present in this particular circular list. The interrupt signal generated on signal line 250 results in an interrupt message being sent to the interrupt management area of interrupt presentation controller 206. In this example, three interrupt servers located in three interrupt presentation controllers are in the circular list. These interrupt presentation controllers are interrupt presentation controllers 206, 208, and 210. In this example, link register 238 in interrupt presentation controller 206 points to interrupt presentation controller 210. Link register 249 in interrupt presentation controller 210 points to interrupt presentation controller 208. In turn, link register 244 in interrupt presentation controller 208 points back to interrupt presentation controller 206 to form the circular list or loop according to a preferred embodiment of the present invention.

Of course, more groups or circular lists may be formed depending on the particular implementation. A separate link register in the interrupt management areas would be required for each such group and further highest order bits in the interrupt source number would need to be assigned to select which link register to use. Different numbers of interrupt presentation controllers also may be present.

In the illustrative example, the interrupt message or request sent to interrupt presentation controller 206 is reviewed to identify whether the high order bit in the interrupt server number in the message specifies that the interrupt is to be handled by this specific interrupt presentation controller. If the high order bit provides such an indication, then the operations in handling the interrupt message or request are handled using a conventional mechanism, such as that described in U.S. Pat. No. 5,701,495, which is incorporated here and by reference.

If the high order bit in the interrupt server number specifies that the interrupt is to be handled by the server group in which interrupt presentation controller 206 is a member, and if the current interrupt priority identified in priority 236 is less favored than that in the interrupt message, the interrupt is again accepted and processed as described above.

In these examples, interrupt message delivery is determined solely by the state of a local interrupt presentation controller, rather than by the interrupt source controller. Each of these interrupt presentation controllers implements a first fit algorithm in which the priority in the interrupt message or request is compared to the priority of the interrupt server. If the priority of the interrupt server is equal to or more favored than the interrupt in the message request, interrupt presentation controller 206 will be unable to handle or accept the interrupt. Also, if the low order bits in the interrupt server number field in the interrupt message do not match the content of link register 238, the message is forwarded to another interrupt server in the group as specified in link register 238.

In this case, the interrupt message is then passed to interrupt presentation controller 210. If the low order bits of the interrupt message's interrupt server number field match the contents of the link register, this match indicates that the message has traveled all around the loop and was not assigned to a server for processing. At that point, the interrupt is "rejected" and sent back to its interrupt source controller, which is then responsible for representing the interrupt at a later time when the interrupt is more likely to be accepted for handling because it is likely that the states of the various interrupt servers will have changed sufficiently for the interrupt to "find a home" for processing.

Interrupt presentation controller 210 performs the same process as interrupt presentation controller 206. If interrupt presentation controller 210 is unable to handle the interrupt message, the message is then passed on to interrupt presentation controller 208, which performs the same process. If this interrupt presentation controller also is unable to handle the interrupt message, the interrupt is then rejected with this rejection being communicated to interrupt source controller 202. A rejected interrupt message is represented at a later time.

As a result, the mechanism of the present invention routes the interrupt message once through the interrupt presentation controllers in a group prior to making a determination that no current processors are able to accept the interrupt. This process is performed rather than re-presenting the message multiple times through all of the system interrupt presentation controllers.

In this manner, interrupt messages are not presented to all of the interrupt presentation controllers. For example, the interrupt generated on signal line 252 does not result in an interrupt message being sent to interrupt presentation controller 206. Consequently, interrupt presentation controller 206 is not burdened with most of the interrupt load and the interconnect fabric 102 of FIG. 1 does not experience extra message traffic.

Additionally, an operation is employed to change the interrupt server number field in interrupt server number 212, within interrupt source controller 202, to the value contained in the link register of the interrupt presentation controller that accepts the interrupt message. In this manner, the next interrupt message from the interrupt source controller will look for an interrupt presentation controller that is the next one in the chain or list, thus, evenly distributing the load among the processors in the group.

The interrupt server number change operation may be implemented in different ways. One example of implementation involves having the interrupt presentation controller hardware perform this operation automatically, either when the interrupt is acknowledged by the processor associated with the interrupt presentation controller, or when the associated processor indicates that the processor has finished with the specific interrupt via an end of interrupt (EOI) operation that the associated processors signal to the presentation controller. In another mechanism, the code path to the associated processor may perform a store operation to the interrupt server number field in the interrupt source controller. The particular mechanism selected depends on the characteristics of the particular platform used.

Figure 3:
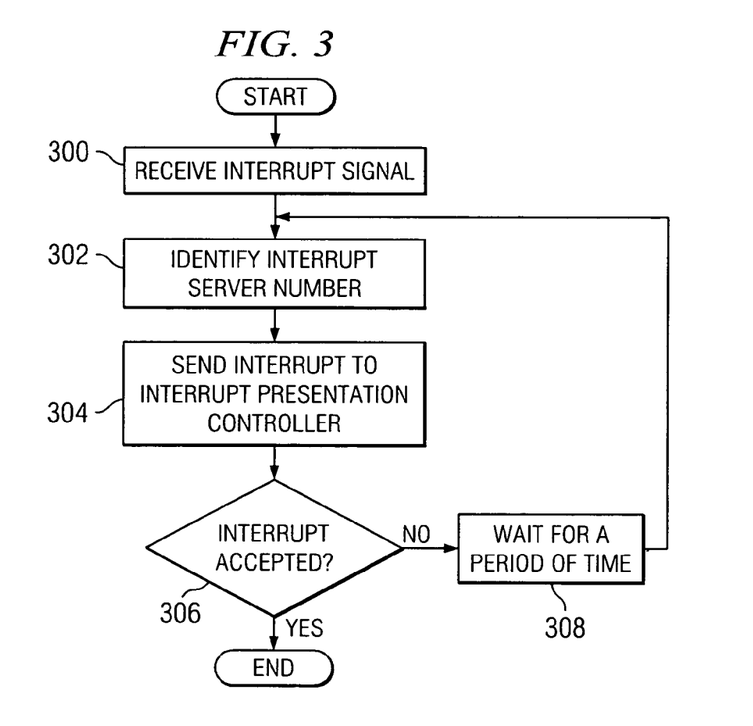
FIG. 3 is a flowchart of a process for managing an interrupt signal in accordance with a preferred embodiment of the present invention.

Turning now to FIG. 3, a flowchart of a process for managing an interrupt signal is depicted in accordance with a preferred embodiment of the present invention. The process illustrated in FIG. 3 may be implemented within an interrupt source controller, such as interrupt source controller 202 in FIG. 2. These steps may be implemented using instructions, such as those in firmware, or through an application specific integrated circuit (ASIC).

The process begins by receiving an interrupt signal over a line (step 300). An interrupt server number is identified (step 302). The determination of specific server versus a group of servers is performed by the device driver when the device driver registered for the interrupt and the software established the interrupt server number associated with this interrupt source. At that time, the high order bit(s) of the interrupt server number were encoded to either specify a single server or a group. Therefore, the interrupt source controller does not make the determination, rather it is already encoded in the interrupt source number value and is handled by the interrupt presentation controller processing which was previously described.

Next, an interrupt message is sent to an interrupt server in an interrupt presentation controller identified within the interrupt server number (step 304). Thereafter, a determination is made as to whether the interrupt message has been accepted (step 306). If the interrupt message is not accepted, the process waits for a period of time (step 308) then proceeds to represent the interrupt at a later time by looping back to step 302. This process is known as "interrupt rejection and representation" and is implemented using other mechanisms such as those in U.S. Pat. No. 5,701,495 or U.S. Pat. No. 6,430,643, which are incorporated here and by reference. Returning again to the determination made in step 306, if the interrupt message is accepted, the process ends.

Figure 4:
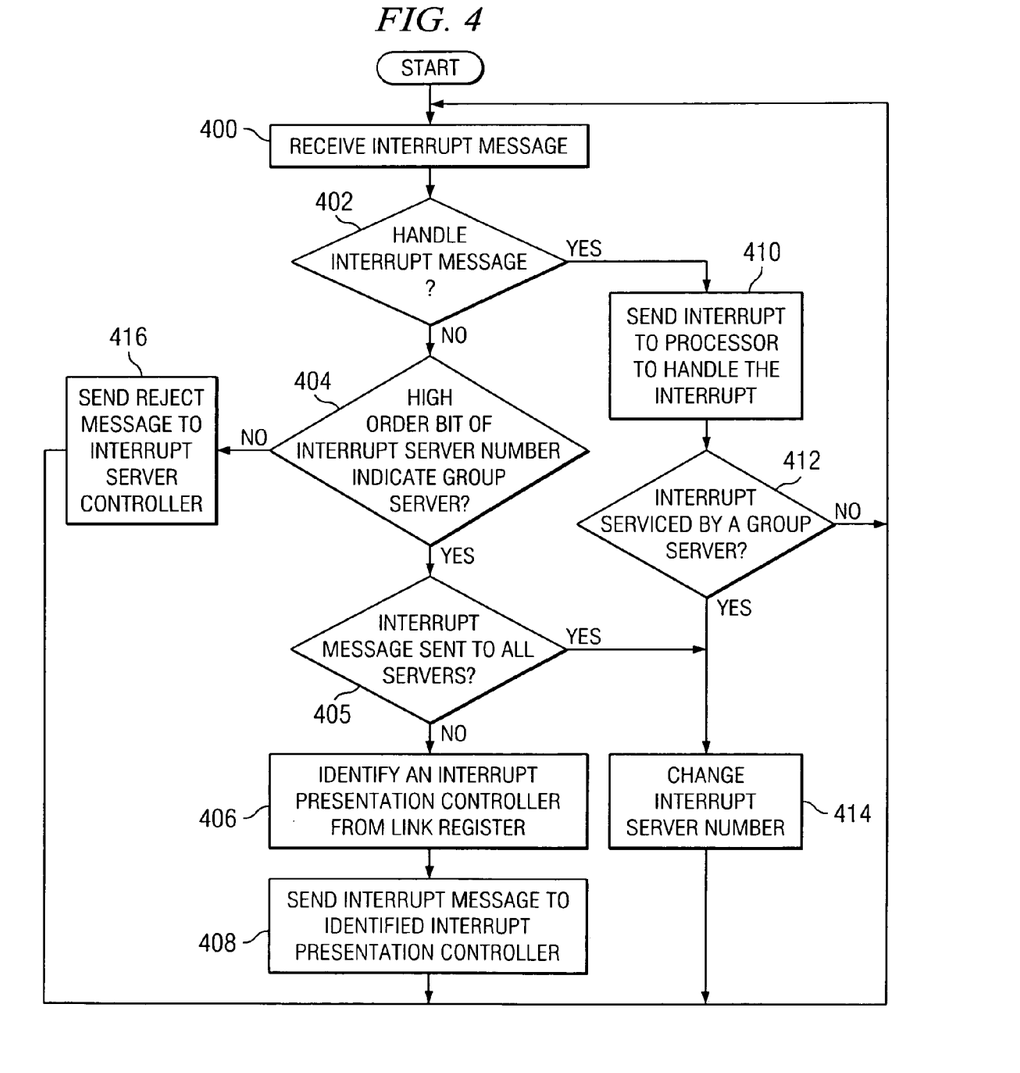
FIG. 4 is a flowchart of a process for evaluating and handling an interrupt in an interrupt presentation controller in accordance with a preferred embodiment of the present invention.

With reference next to FIG. 4, a flowchart of a process for evaluating and handling an interrupt in an interrupt presentation controller is depicted in accordance with a preferred embodiment of the present invention. The process illustrated in FIG. 4 may be implemented in an interrupt presentation controller, such as interrupt presentation controller 206 in FIG. 2. The steps illustrated in this figure may be implemented using instructions or through an ASIC in the depicted examples.

The process begins by receiving an interrupt message or request (step 400). A determination is made as to whether the interrupt should be handled (step 402). In these examples, the determination is made using a first fit algorithm. In this type of process, the priority of the interrupt message is compared with the priority of the interrupt server by the interrupt presentation controller. If the priority of the interrupt server is equal to or greater than that of the priority in the interrupt message, then the interrupt message is not handled by the interrupt server.

If the interrupt is not to be handled by this particular interrupt server, a determination is made as to whether the high order bit of the interrupt server number indicates that a group server is to handle the interrupt (step 404). If the determination in step 404 is yes, a determination is made as to whether the interrupt message has been sent to all of the linked servers (step 405). Step 405 involves making a test to determine if the interrupt message has been tested against all the linked servers of the group. In this example, the test is performed by comparing the interrupt messages interrupt server field (the server where the process started) with the current server's link register. If these two values are equal, then the message would be starting the process all over again. To prevent this continuous loop, the interrupt is rejected by proceeding to step 416 as described below. If the interrupt message has not been tested against all the linked server of the group, then another interrupt presentation controller is identified from the link register (step 406). The interrupt message is then sent to the identified interrupt server within the identified interrupt presentation controller (step 408). The process then returns to step 400 of the identified interrupt server.

With reference again to step 402, if the interrupt message is to be handled by this particular interrupt presentation controller, the interrupt message is then sent to a processor associated with the interrupt presentation controller to handle the interrupt (step 410). Next, a determination is made as to whether the interrupt was serviced by a group server (step 412). If the interrupt was serviced by a group server, the interrupt server number is changed (step 414) with the process returning to step 400 as described above. Otherwise, the process returns directly to step 400 from step 412.

In step 414, the interrupt server number is changed to another interrupt presentation controller in the group. In these examples, the next interrupt presentation controller used is one identified in the link register of the presentation controller handling the interrupt message. Of course, other mechanisms may be used to change the interrupt server number depending on the particular implementation.

With reference back to step 404, if the high order bit of the interrupt server number does not indicate that a group server is to process the interrupt, a reject message is sent to the interrupt controller (step 416) with the process then returning to step 400 as described above.

Thus, the present invention provides an improved method, apparatus, and computer instructions for handling interrupts and an interrupt subsystem. The mechanism of the present invention re-interprets the server number field of the interrupt message to be the address of one of the group of server processors. The interrupt presentation controllers in the server pool's processors are linked together in a circular list. Further, a first fit algorithm is implemented within these interrupt presentation controllers in the illustrative examples to determine whether an interrupt message is to be handled. Further, the server number field is modified to route a subsequent interrupt message to a different interrupt presentation controller for a subsequent interrupt message if the interrupt is accepted for processing.

The mechanism of the present invention provides an interrupt subsystem that may be scaled to virtually any number of processors without increasing congestion as compared to presently used interrupt subsystems architectures. Further, no central collection of logic is used to distribute or handle these interrupt messages. As a result, continual redesign of the interrupt subsystem as the number of system processors grows is avoided, as well as the expense of an interrupt subsystem in small systems that are sized for a maximum size system. Further, a duplication of central logic collection is also not required. Further, direct interrupt messages are not necessary. As a result, interrupt presentation controllers are not burdened with interrupt messages that are not potential candidates for processing the interrupt. In these examples, interrupt messages are circulated only to interrupt presentation controllers that are potential candidates for processing the interrupt message. Further, this mechanism evenly distributes interrupt messages among all potential processors in a group server pool.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for managing interrupts using a set of interrupt servers associated with presentation controllers, the method comprising:
   responsive to receiving an interrupt signal, identifying a first interrupt server in the set of interrupt servers to handle the interrupt, wherein the set of interrupt servers are linked in a circular list using a set of identifiers; and
   sending the interrupt to a second interrupt server potentially associated with a second presentation controller in the set of presentation controllers based on an identifier identifying the second interrupt server and its presentation controller in the set of presentation controllers if the first interrupt server is unable to handle the interrupt, wherein the identifier is found within the first presentation controller, wherein the interrupt is passed to different interrupt servers potentially associated with different presentation controllers within the circular list.

2. The method of claim 1, wherein the found set of identifiers are found in a set of interrupt management areas associated with the set of interrupt servers managed by the presentation controllers.

3. The method of claim 2, wherein the identifier is located in a register in the interrupt management area of the first interrupt server located in the first presentation controller.

4. The method of claim 1, wherein the first interrupt server associated with a first presentation controller is unable to handle the interrupt if the interrupt has a priority that is less than the current priority of the first interrupt server associated with the first presentation controller.

5. The method of claim 1, wherein the interrupt signal is received by an interrupt source controller.

6. The method of claim 5, wherein the signal is associated with a priority and an interrupt source number identifying the first interrupt server associated with the first interrupt presentation controller.

7. The method of claim 6 further comprising:
   changing the interrupt source number to identify a different interrupt server, potentially associated with a different interrupt presentation controller within the circular list after identifying the first presentation controller.

8. The method of claim 1, wherein the data processing system includes a second set of interrupt servers, potentially associated with a second set of presentation controllers, wherein the second set of interrupt servers, potentially associated with a second set of presentation controllers are linked in a circular list using a second set of identifiers.

9. The method of claim 1, wherein the interrupt signal is received from an adapter in the data processing system.

10. A data processing system comprising:
    an interconnect fabric;
    a set of processors;
    an interrupt source controller connected to the interconnect fabric; and
    a set of interrupt presentation controllers connected to the interconnect fabric, wherein the set of interrupt presentation controllers are logically linked in a loop, wherein each interrupt management area contained in a presentation controller in the set of presentation controllers includes a pointer to another interrupt management area, potentially located in another presentation controller in the set of presentation controllers and wherein an interrupt server located in a presentation controller receiving an interrupt sends the interrupt to the interrupt management area of another interrupt server located, in potentially another presentation controller using a pointer if the interrupt server associated with the presentation controller is unable to process the interrupt.

11. The data processing system of claim 10, wherein the presentation controller is unable to handle the interrupt if a priority of the interrupt is less than a priority of the presentation controller.

12. The data processing system of claim 10, wherein the interconnect fabric is a bus.

13. A data processing system for managing interrupts using a set of presentation controllers, the data processing system comprising:
    a bus system;
    a communications unit connected to the bus system;
    a memory connected to the bus system, wherein the memory includes a set of instructions; and
    a processing unit connected to the bus system, wherein the processing unit executes the set of instructions to identify a first interrupt server associated with a presentation controller in the set of presentation controllers to handle the interrupt in which the set of interrupt servers and their presentation controllers are linked in a circular list using a set of identifiers found in the interrupt management area of the interrupt servers of the set of presentation controllers in response to receiving an interrupt signal; and send the interrupt to a second interrupt server, potentially associated with a second presentation controller in the set of presentation controllers based on an identifier identifying the interrupt server, potentially in a second presentation controller in the set of presentation controllers if the first interrupt server is unable to handle the interrupt in which the identifier is found.

14. A data processing system for managing interrupts using a set of interrupt servers associated with presentation controllers, the data processing system comprising:

identifying means, responsive to receiving an interrupt signal, for identifying a first interrupt server in the set of interrupt servers to handle the interrupt, wherein the set of interrupt servers are linked in a circular list using a set of identifiers; and sending means for sending the interrupt to a second interrupt server potentially associated with a second presentation controller in the set of presentation controllers based on an identifier identifying the second interrupt server and its presentation controller in the set of presentation controllers if the first interrupt server is unable to handle the interrupt, wherein the identifier is found within the first presentation controller, wherein the interrupt is passed to different interrupt servers potentially associated with different presentation controllers within the circular list.

15. The data processing system of claim 14, wherein the found set of identifiers are found in a set of interrupt management area associated with the set of interrupt servers managed by the presentation controllers.

16. The data processing system of claim 14, wherein the first interrupt server associated with a first presentation controller is unable to handle the interrupt if the interrupt has a priority that is less than the current priority of the first interrupt server associated with the first presentation controller.

17. The data processing system of claim 14, wherein the interrupt signal is received by an interrupt source controller.

18. The data processing system of claim 17, wherein the signal is associated with a priority and an interrupt source number identifying the first interrupt server associated with the first interrupt presentation controller.

19. The data processing system of claim 18 further comprising:

changing means for changing the interrupt source number to identify a different interrupt server, potentially associated with a different interrupt presentation controller within the circular list after identifying the first presentation controller.

20. The data processing system of claim 14, wherein the data processing system includes a second set of interrupt servers, potentially associated with a second set of presentation controllers, wherein the second set of interrupt servers, potentially associated with a second set of presentation controllers are linked in a circular list using a second set of identifiers.

21. The data processing system of claim 14, wherein the interrupt signal is received from an adapter in the data processing system.

22. A computer program product in a computer readable medium for managing interrupts using a set of interrupt servers associated with presentation controllers, the computer program product comprising:

first instructions, responsive to receiving an interrupt signal, for identifying a first interrupt server in the set of interrupt servers to handle the interrupt, wherein the set of interrupt servers are linked in a circular list using a set of identifiers; and second instructions for sending the interrupt to a second interrupt server potentially associated with a second presentation controller in the set of presentation controllers based on an identifier identifying the second interrupt server and its presentation controller in the set of presentation controllers if the first interrupt server is unable to handle the interrupt, wherein the identifier is found within the first presentation controller, wherein the interrupt is passed to different interrupt servers potentially associated with different presentation controllers within the circular list.

23. The computer program product of claim 22, wherein the found set of identifiers are found in a set of interrupt management areas associated with the set of interrupt servers managed by the presentation controllers.

24. The computer program product of claim 22, wherein the first interrupt server associated with a first presentation controller is unable to handle the interrupt if the interrupt has a priority that is less than the current priority of the first interrupt server associated with the first presentation controller.

25. The computer program product of claim 22, wherein the interrupt signal is received by an interrupt source controller.

* * * * *